(12) United States Patent
Zhang et al.

(10) Patent No.: US 11,821,185 B2
(45) Date of Patent: Nov. 21, 2023

(54) AUTOMATIC FAUCET

(71) Applicant: Xiamen Forbetter Sanitary Ware Co., Ltd., Fujian (CN)

(72) Inventors: Xingui Zhang, Xiamen (CN); Yihui Chen, Xiamen (CN); Mouyong Lin, Xiamen (CN)

(*) Notice: Subject to any disclaimer, the term of this patent is extended or adjusted under 35 U.S.C. 154(b) by 351 days.

(21) Appl. No.: 17/385,933

(22) Filed: Jul. 27, 2021

(65) Prior Publication Data
US 2023/0034753 A1 Feb. 2, 2023

(51) Int. Cl.
*E03C 1/04* (2006.01)
*F16K 11/00* (2006.01)

(52) U.S. Cl.
CPC ......... *E03C 1/0404* (2013.01); *F16K 19/006* (2013.01); *E03C 2001/0415* (2013.01)

(58) Field of Classification Search
CPC .......... E03C 1/04; E03C 1/0404; E03C 1/057; E03C 2001/0415; F16K 19/006; F16K 31/605

USPC .................................................... 4/675–678
See application file for complete search history.

(56) References Cited

U.S. PATENT DOCUMENTS

| 10,036,150 | B2* | 7/2018 | Yan ........................... E03C 1/04 |
| 2015/0292187 | A1* | 10/2015 | Tseng ...................... E03C 1/055 4/677 |
| 2016/0177551 | A1* | 6/2016 | Li .......................... E03C 1/0404 324/251 |
| 2016/0208465 | A1* | 7/2016 | Evans .................... F16K 19/006 |

\* cited by examiner

*Primary Examiner* — Tuan N Nguyen

(57) ABSTRACT

An automatic faucet includes a faucet body, an inner tube, a faucet nozzle, a sensor, and a waterway control unit. The waterway control unit is fitted in the faucet body. The waterway control unit includes a mixed water valve core for delivering water to the inner tube, a solenoid valve for controlling water flowing out from the inner tube, and an integrated valve seat for accommodating the mixed water valve core and the solenoid valve. The sensor is electrically connected to the solenoid valve. The structure and the assembly process of the faucet are simplified.

10 Claims, 16 Drawing Sheets

AUTOMATIC FAUCET

BACKGROUND OF THE INVENTION

1. Field of the Invention

The present invention relates to a kitchen faucet, and more particularly to an easy-to-install automatic faucet.

2. Description of the Prior Art

An automatic faucet is a faucet equipped with a proximity sensor and mechanism that opens its valve to allow water to flow in response to the presence of a user's hands in close proximity. The faucet closes its valve again after a few seconds or when it no longer detects the presence of a user's hands. It has the advantages of convenient use and sanitation.

A conventional automatic faucet generally has a solenoid valve disposed in a sensor control box. The sensor control box and the faucet body of the automatic faucet are independent of each other. The sensor control box is installed under the countertop. Because the sensor control box and the faucet body are independent of each other, consumers need to install the faucet body and the sensor control box by themselves after purchasing this kind of automatic faucet. However, the space under the countertop is relatively narrow and the operation is inconvenient. It is very inconvenient for consumers to install the senor control box.

In an improved automatic faucet, the solenoid valve is arranged on the faucet nozzle of the automatic faucet, which facilitates consumers to install the automatic faucet. But, the solenoid valve will increase the weight of the faucet nozzle. For a pull-out faucet with a movable faucet nozzle, when the user moves the faucet nozzle, the solenoid valve is moved together, causing the user to spend a lot of effort to move the faucet nozzle. This will affect the user's feeling of moving the faucet nozzle, resulting in a bad use experience.

In view of the above shortcomings, in another improved automatic faucet, the solenoid valve is installed on the faucet body of the automatic faucet. Consumers do not need to install a sensor control box having a solenoid valve after purchasing an automatic faucet, and there is no need to move the solenoid valve together when the faucet nozzle is moved. However, the conventional automatic faucet with the solenoid valve installed on the faucet body also has some problems. The solenoid valve needs to be installed on a solenoid valve seat disposed in the faucet body. A mixed water valve core needs to be installed on a mixed water valve seat disposed in the faucet body to adjust the temperature of water flowing out of the faucet. The mixed water valve seat and the solenoid valve seat are independent of each other. In this way, the solenoid valve seat and the mixed water valve seat need to be connected with a complicated waterway connection structure, so that the solenoid valve can control the mixed water valve core for water to flow out from the faucet nozzle and the external cold and hot water to flow to the mixed water valve core. The assembly is relatively complicated and cumbersome, resulting in low assembly efficiency of the automatic faucet.

SUMMARY OF THE INVENTION

The primary object of the present invention is to provide an easy-to-install automatic faucet, which improves the assembly efficiency of the faucet.

In order to achieve the above object, the present invention adopts the following solutions.

An automatic faucet comprises a faucet body, an inner tube, a faucet nozzle, a sensor, and a waterway control unit. The waterway control unit includes a mixed water valve core, a solenoid valve, and an integrated valve seat. The integrated valve seat is fitted in the faucet body. The integrated valve seat has a cold water inlet, a hot water inlet, a mixed water outlet, a water-passing hole, and a valve core mounting groove. The cold water inlet and the hot water inlet are in communication with the valve core mounting groove. The water-passing hole is in communication with the valve core mounting groove through a water-passing passage defined in the integrated valve seat. The mixed water outlet is in communication with the water-passing hole. The solenoid valve is installed to the integrated valve seat. The solenoid valve has a valve head extending into the water-passing hole. The valve head of the solenoid valve is configured to open and close the mixed water outlet. The mixed water valve core is installed in the valve core mounting groove of the integrated valve seat. The mixed water valve core is configured to control the cold water inlet and the hot water inlet to communicate with the water-passing passage. The inner tube is inserted through the faucet body. The inner tube has an outlet end and an inlet end connected to the faucet nozzle and the mixed water outlet of the integrated valve seat, respectively. The sensor is electrically connected to the solenoid valve.

Preferably, the faucet body includes a main body and a mounting tube connected to one side of the main body. An inner chamber of the mounting tube communicates with an inner chamber of the main body. An opening of the cold water inlet, an opening of the hot water inlet and an opening of the mixed water outlet of the integrated valve seat face downward. The cold water inlet, the hot water inlet and the mixed water outlet are located in the inner chamber of the main body. The cold water inlet and the hot water inlet are in communication with the valve core mounting groove through a cold water passage and a hot water passage arranged inside the integrated valve seat, respectively. The inlet end of the inner tube is inserted through the inner chamber of the main body and connected to the mixed water outlet. The valve core mounting groove of the integrated valve seat has an opening facing one side of the integrated valve seat. The valve core mounting groove is located in the mounting tube. The mixed water valve core is inserted into the valve core mounting groove. An opening of the water-passing hole of the integrated valve seat faces upward. The solenoid valve is installed on an upper end of the integrated valve seat. The solenoid valve is located in the inner chamber of the main body.

Preferably, the opening of the mixed water outlet of the integrated valve seat faces downward. The integrated valve seat further has a tube hole for the inner tube to pass therethrough.

Preferably, the inner tube is in clearance fit with the tube hole.

Preferably, the integrated valve seat is fixed to the faucet body by screws.

Preferably, the solenoid valve is configured to block an opening of the water-passing hole. The solenoid valve is provided with a partition to divide an internal space of the water-passing hole into a water chamber and an air chamber. The water chamber is in communication with the valve core mounting groove through the water-passing passage. The water chamber is in communication with the mixed water outlet. The solenoid valve has an air hole disposed in the air chamber. The air hole of the solenoid valve is in communication with the air chamber. The valve head of the solenoid valve extends into the water chamber to control opening and closing of the mixed water outlet. The integrated valve seat has an air passage communicating with the air chamber and the mixed water outlet.

Preferably, the integrated valve seat has a core-pulling opening communicating with the air passage, and the core-pulling opening is blocked by a sealing plug.

Preferably, the integrated valve seat further has a buffer hole. An inner end of the buffer hole communicates with the water-passing passage, and an outer end of the buffer hole communicates with an outside. A buffer assembly is fitted in the buffer hole.

Preferably, the buffer assembly includes a buffer block and a buffer spring. The buffer block is movably accommodated in the buffer hole. The buffer block is movably fitted in the buffer hole. A first end of the buffer spring is inserted into the buffer hole. The first end of the buffer spring abuts against one side of the buffer block away from an inner end of the buffer hole. A second end of the buffer spring abuts against the faucet body.

Preferably, the integrated valve seat further has a core-pulling hole communicating with the water-passing passage, and the core-pulling hole is blocked by a core-pulling plug.

With the above solutions, the solenoid valve of the present invention is installed to the integrated valve seat and controls the opening and closing of the mixed water outlet of the integrated valve seat. The mixed water valve core of the present invention is installed in the valve core mounting groove of the integrated valve seat. The valve core mounting groove is in communication with the cold water inlet, the hot water inlet and the water-passing passage of the integrated valve seat. The water-passing passage is in communication with the mixed water outlet through the water-passing hole. The mixed water valve core is configured to control the cold water inlet and the hot water inlet to communicate with the water-passing passage. The integrated valve seat of the present invention integrates the conventional solenoid valve seat and the mixed water valve seat as well as the waterway connection structure between the conventional solenoid valve seat and the mixed water valve seat. Thus, the present invention does not need to install the conventional waterway connection structure between the solenoid valve seat and the mixed water valve seat, so as to simplify the structure and the assembly process of the faucet and to improve the assembly efficiency of the faucet.

DETAILED DESCRIPTION OF THE PREFERRED EMBODIMENTS

Figure 1:
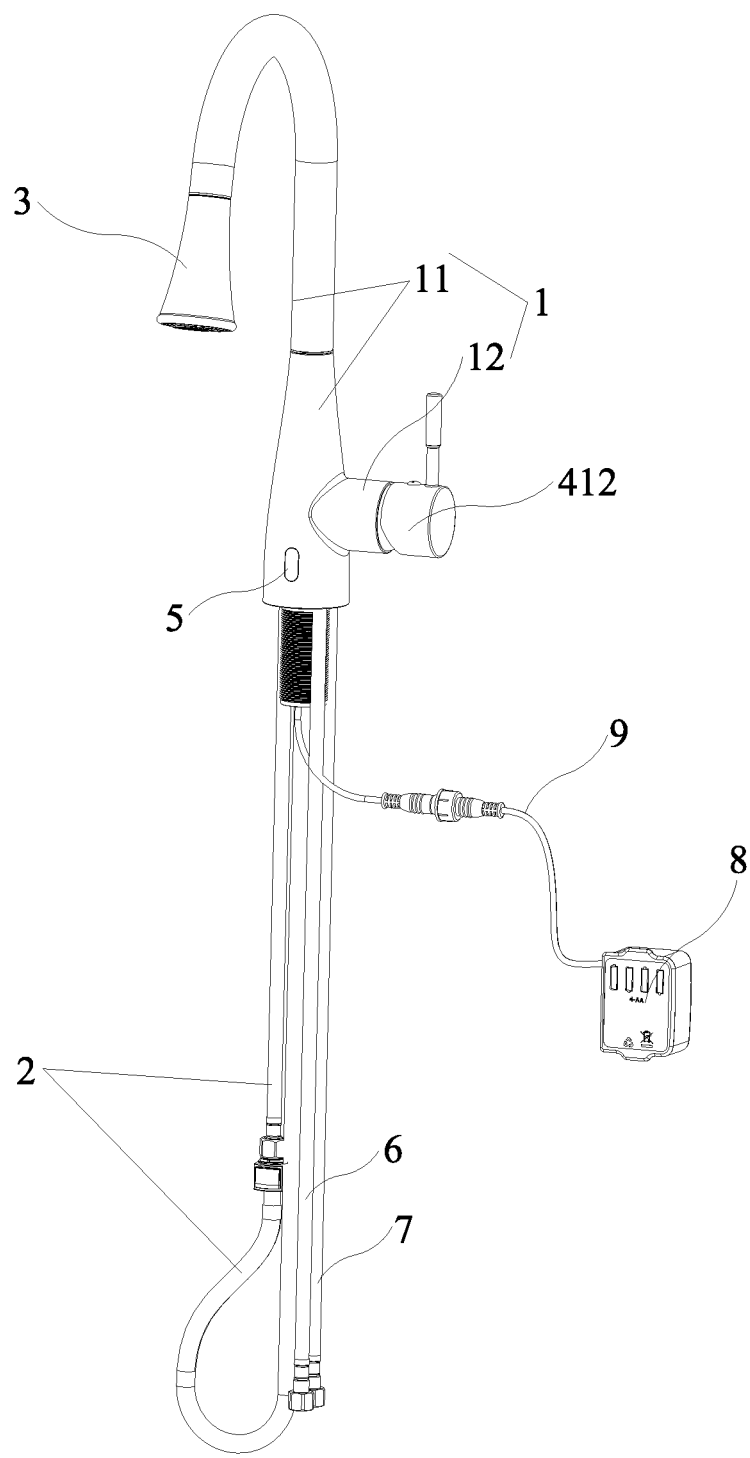
FIG. 1 is a perspective view of a first embodiment of the present invention.
Figure 2:
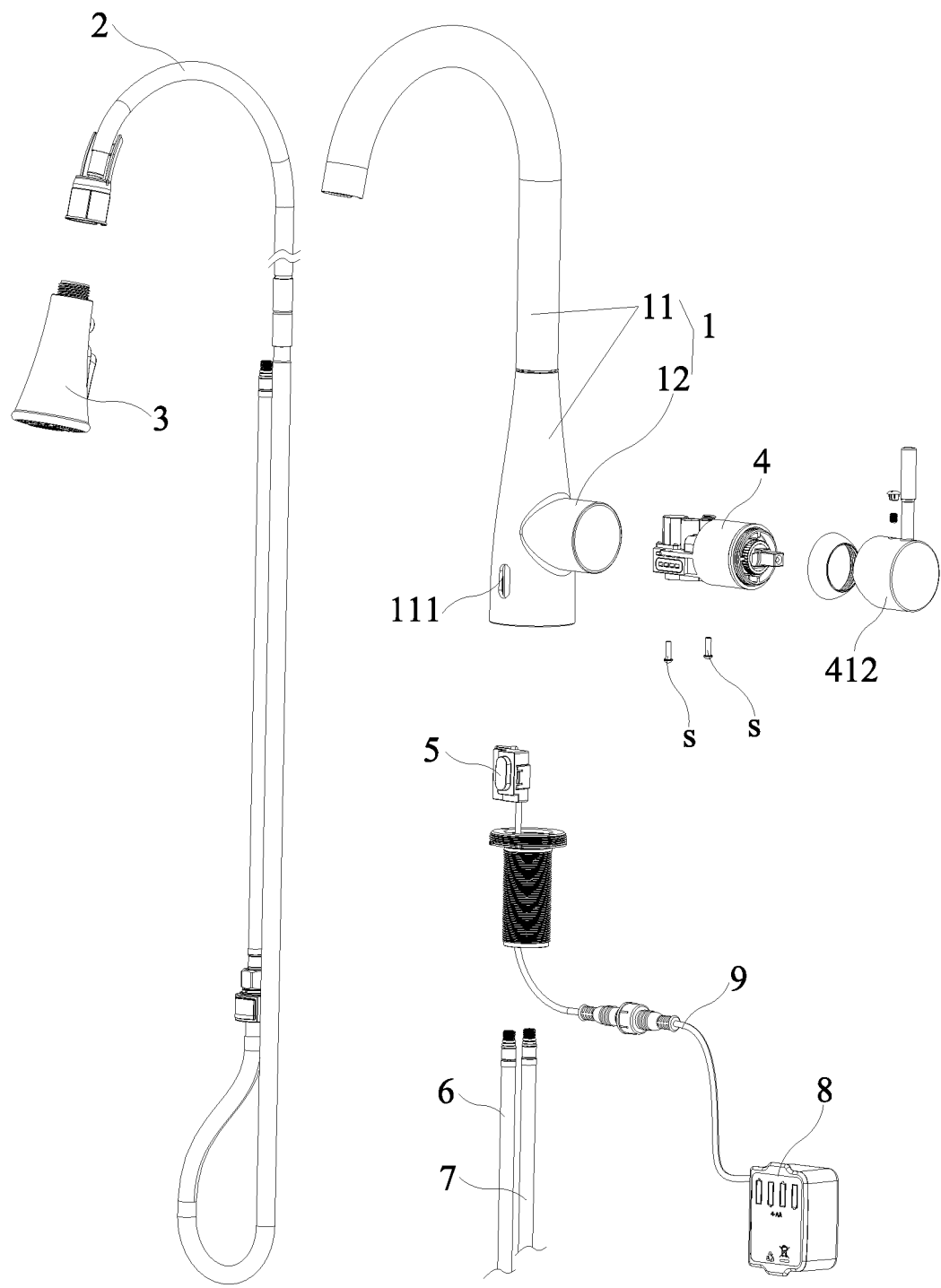
FIG. 2 is an exploded view of the first embodiment of the present invention.
Figure 3:
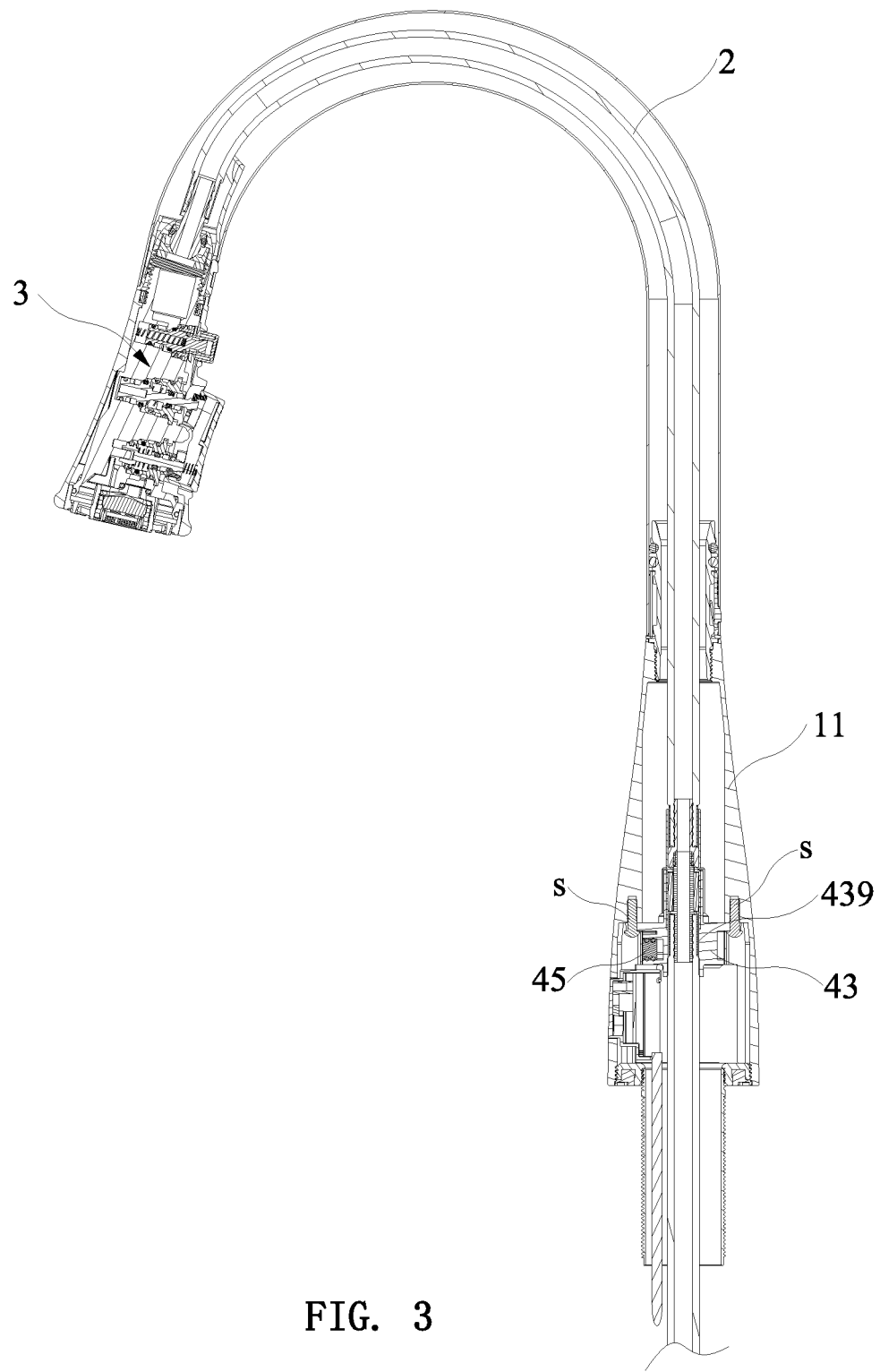
FIG. 3 is a first cross-sectional view of the first embodiment of the present invention.

Referring to FIG. 1 through FIG. 26, the present invention discloses an automatic faucet, comprising a faucet body 1, an inner tube 2, a faucet nozzle 3, a waterway control unit 4, and a sensor 5. The waterway control unit 4 includes a mixed water valve core 41 for delivering water to the inner tube 2, a solenoid valve 42 for controlling water to flow out from the inner tube 2, and an integrated valve seat 43 for accommodating the mixed water valve core 41 and the solenoid valve 42. The sensor 5 is electrically connected to the solenoid valve 42 to control the action of the solenoid valve 42. The sensor 5 and the solenoid valve 42 may be powered by an external power source 8. The power source 8 is electrically connected to the sensor 5 through a wire 9. The sensor 5 may be installed on the faucet body 1 or on the faucet nozzle 3. The sensor 5 may be installed independently of the faucet body 1 and the faucet nozzle 3. Preferably, the sensor 5 is installed on the faucet body 1.

As shown in FIG. 1 through FIG. 26, the waterway control unit 4 is fitted in the faucet body 1. The integrated valve seat 43 has a cold water inlet 431, a hot water inlet 432, a mixed water outlet 433, a water-passing hole 434, and a valve core mounting groove 435. The cold water inlet 431 and the hot water inlet 432 are in communication with the valve core mounting groove 435. The water-passing hole 434 is in communication with the valve core mounting groove 435 through a water-passing passage 436 defined in the integrated valve seat 43. The mixed water outlet 433 is in communication with the water-passing hole 434. The inner tube 2 is inserted through the faucet body 1. The inner tube 2 has an inlet end and an outlet end respectively connected to the mixed water outlet 433 of the integrated valve seat 43 and the faucet nozzle 3. The solenoid valve 42 is installed to the integrated valve seat 43. The solenoid valve 42 is locked to the integrated valve seat 43 through screws d. The solenoid valve 42 has a valve head 421 extending into the water-passing hole 434. The valve head 421 of the solenoid valve 42 is configured to open and close the mixed water outlet 433 for controlling water flowing out of the inner tube 2. The mixed water valve core 41 is installed in the valve core mounting groove 435 of the integrated valve seat 43. The mixed water valve core 41 is configured to control the cold water inlet 431 and the hot water inlet 432 to communicate with the water-passing passage 436 for controlling the temperature of water flowing out from the inner tube 2.

The solenoid valve 42 of the present invention is installed to the integrated valve seat 43 and controls the opening and closing of the mixed water outlet 433 of the integrated valve seat 43. The mixed water valve core 41 of the present invention is installed in the valve core mounting groove 435 of the integrated valve seat 43. The valve core mounting groove 435 is in communication with the cold water inlet 431, the hot water inlet 432 and the water-passing passage 436 of the integrated valve seat 43. The water-passing passage 436 is in communication with the mixed water outlet 433 through the water-passing hole 434. The mixed water valve core 41 is configured to control the cold water inlet 431 and the hot water inlet 432 to communicate with the water-passing passage 436. The integrated valve seat of the present invention integrates the conventional solenoid valve seat and the mixed water valve seat as well as the waterway connection structure between the conventional solenoid valve seat and the mixed water valve seat. Thus, the present invention does not need to install the conventional waterway connection structure between the solenoid valve seat and the mixed water valve seat, so as to simplify the structure and the assembly process of the faucet and to improve the assembly efficiency of the faucet.

In order to further explain the technical solution of the present invention, the following two embodiments illustrate the present invention in detail.

First Embodiment

FIGS. 1-13 show a first embodiment of the present invention. The faucet body 1 includes a main body 11 and a mounting tube 12 connected to one side of the main body 11. The inner chamber of the mounting tube 12 communicates with the inner chamber of the main body 11. The opening of the cold water inlet 431, the opening of the hot water inlet 432 and the opening of the mixed water outlet 433 of the integrated valve seat 43 all face downward. The cold water inlet 431, the hot water inlet 432 and the mixed water outlet 433 are all located in the inner chamber of the main body 11. The cold water inlet 431 and the hot water inlet 432 are in communication with the valve core mounting groove 435 through a cold water passage 437 and a hot water passage 438 arranged inside the integrated valve seat 43, respectively. The inlet end of the inner tube 2 is inserted through the inner chamber of the main body 11 and connected to the mixed water outlet 433. The valve core mounting groove 435 of the integrated valve seat 43 has an opening facing one side of the integrated valve seat 43. The valve core mounting groove 435 is located in the mounting tube 12. The mixed water valve core 41 is inserted into the valve core mounting groove 435. The integrated valve seat 43 is connected with a valve cover 48. The valve cover 48 abuts against the mixed water valve core 41 to prevent the mixed water valve core 41 from being separated from the valve core mounting groove 435. The valve cover 48 may be threadedly connected with the inner wall of the valve core mounting groove 435. A lever 411 of the mixed water valve core 41 passes through the valve cover 48. The lever 411 of the mixed water valve core 41 may be connected with a handle 412 for controlling the mixed water valve core 41. The opening of the water-passing hole 434 of the integrated valve seat 43 faces upward. The solenoid valve 42 is installed on the upper end of the integrated valve seat 43, and the solenoid valve 42 is located in the inner chamber of the main body 11. The sensor 5 may be installed on the main body 11. The main body 11 has a mounting hole 111 to receive the sensor 5. The opening of the cold water inlet 431 and the opening of the hot water inlet 432 face downward, so that the cold water inlet 431 and the hot water inlet 432 are connected to a cold water tube 6 and a hot water tube 7, respectively. The solenoid valve 42 of the waterway control unit 4 is located in the inner chamber of the main body 11. The solenoid valve 42 is installed to the upper end of the integrated valve seat 43. This can prevent the solenoid valve 42 from interfering with the installation of the cold water tube 6 and the hot water tube 7. The integrated valve seat 43 is fixed to the main body 11 by screws s, so as to fix the waterway control unit 4 in the faucet body 1. There are two installation methods for the waterway control unit 4 to be installed to the faucet body 1. Both installation methods are very convenient. The first installation method is described below. The solenoid valve 42 is first installed to the integrated valve seat 43, and the mixed water valve core 41 is inserted into the valve core mounting groove 435 of the integrated valve seat 43, and the valve cover 48 is threadedly connected to the valve core mounting groove 435 of the integrated valve seat 43 to prevent the mixed water valve core 41 from being separated from the valve core mounting groove 435, and the waterway control unit 4 is inserted from the mounting tube 12 into the faucet body 1. Finally, the integrated valve seat 43 is locked to the main body 11 of the faucet body 1. The second installation method is described below. The solenoid valve 2 is first installed to the integrated valve seat 43, and the solenoid valve 2 and the integrated valve seat 43 are inserted from the mounting tube 12 into the faucet body 1, and the integrated valve seat 43 is locked to the main body 11 of the faucet body 1 with screws s, and the mixed water valve core 41 is inserted into the valve core mounting groove 435 of the integrated valve seat 43. Finally, the valve cover 48 is threadedly connected to the valve core mounting groove 435 of the integrated valve seat 43 to prevent the mixed water valve core 41 from being separated from the valve core mounting groove 435.

Figure 4:
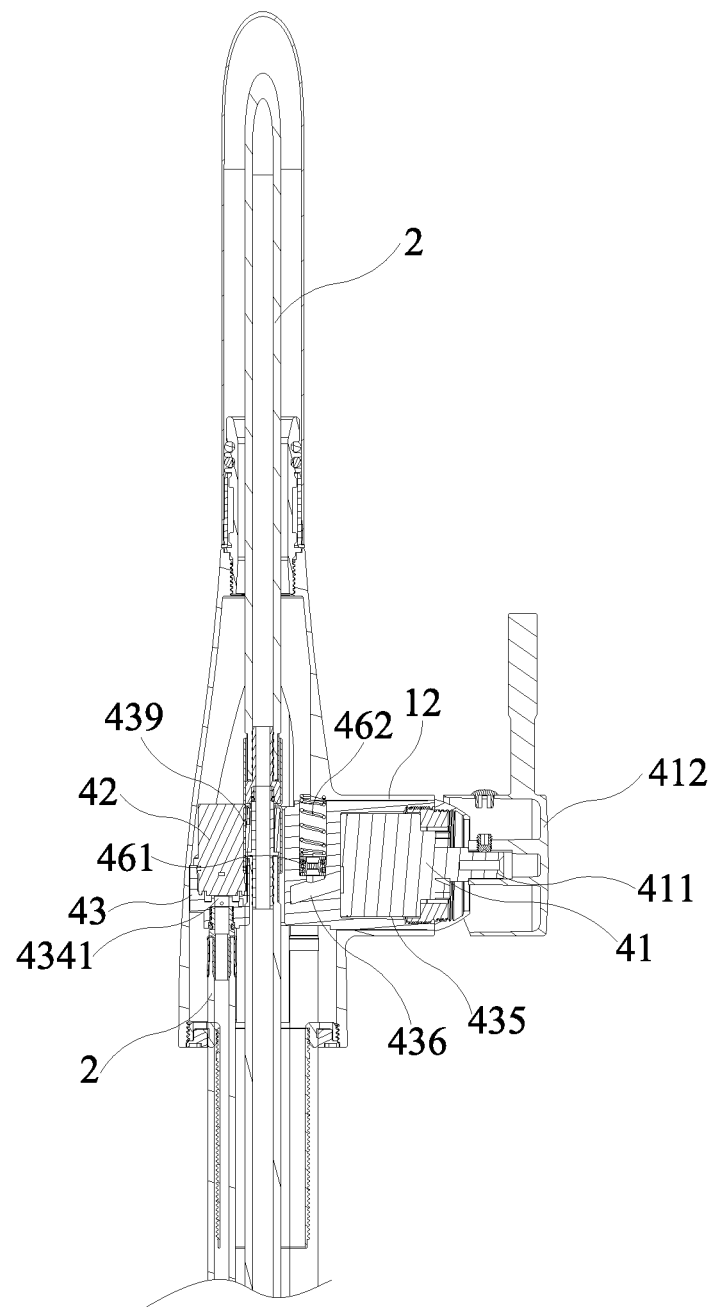
FIG. 4 is a second cross-sectional view of the first embodiment of the present invention.
Figure 5:
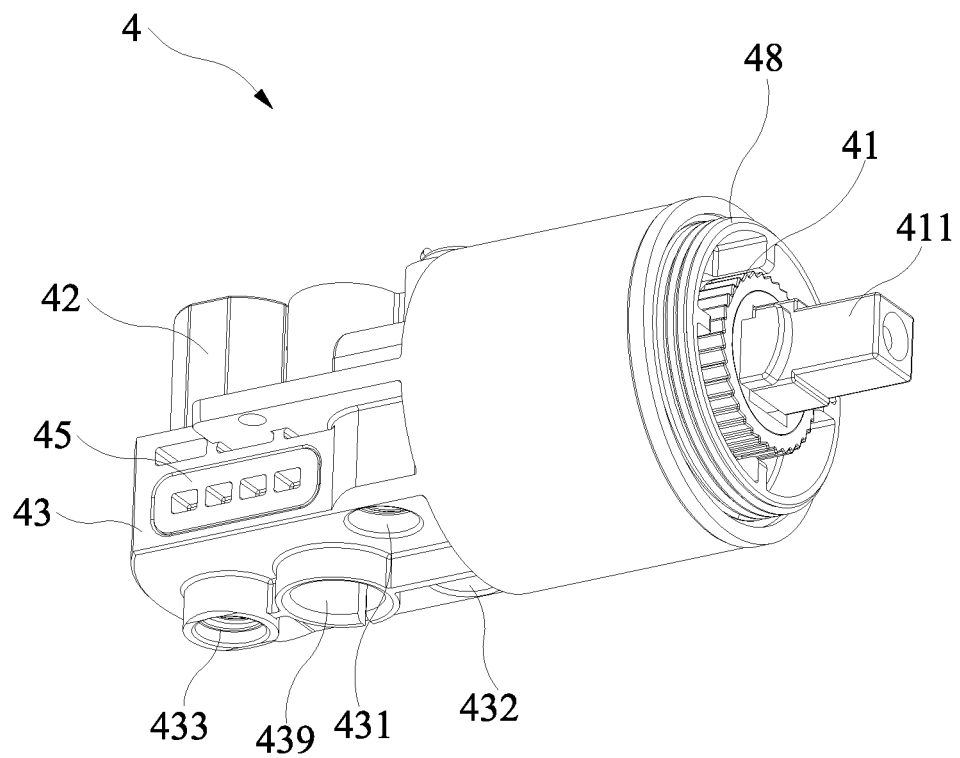
FIG. 5 is a first perspective view of the waterway control unit of the first embodiment of the present invention.
Figure 6:
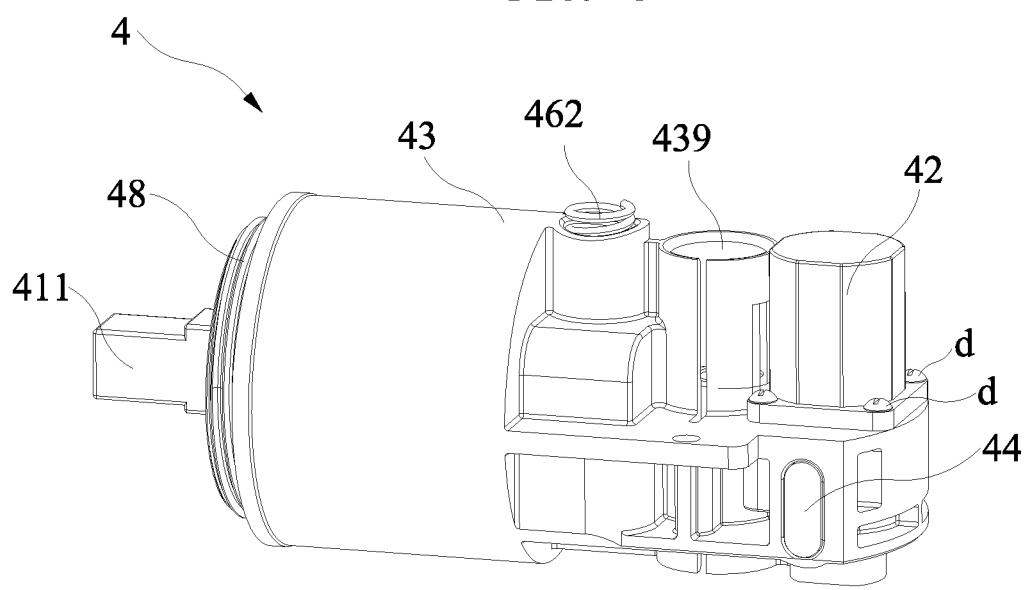
FIG. 6 is a second perspective view of the waterway control unit of the first embodiment of the present invention.
Figure 7:
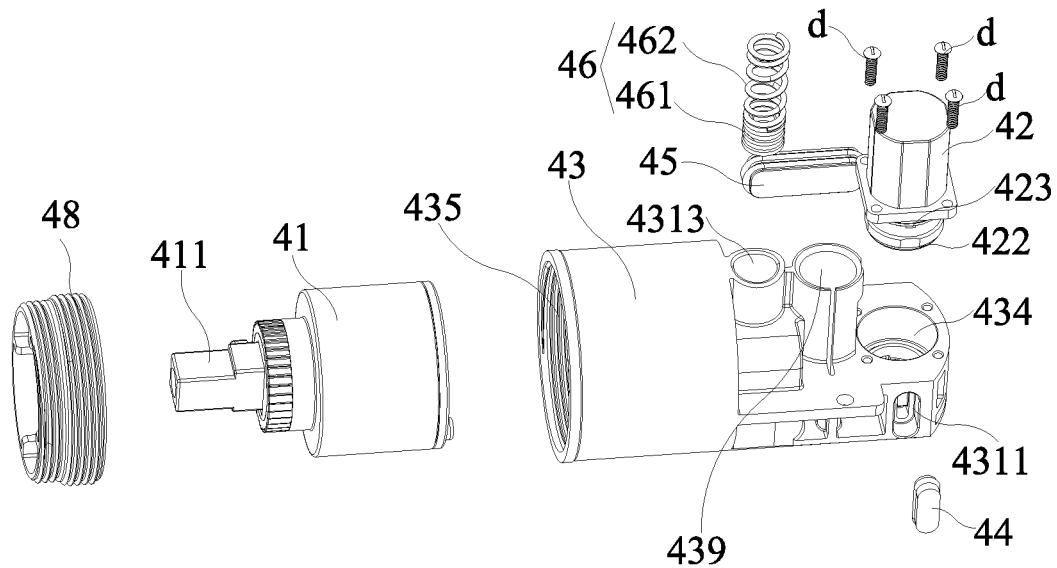
FIG. 7 is a first exploded view of the waterway control unit of the first embodiment of the present invention.
Figure 8:
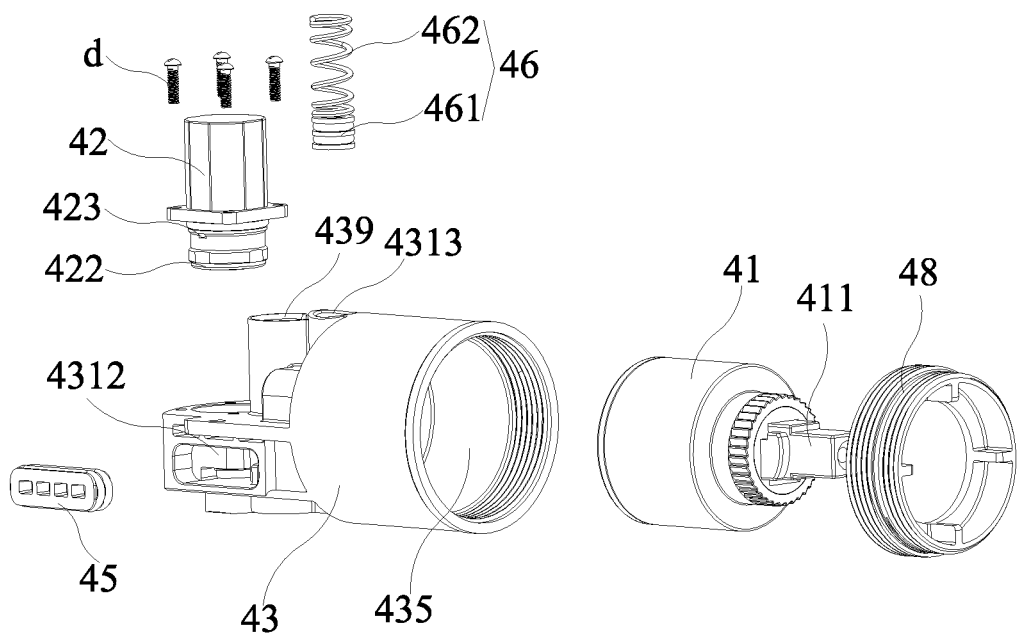
FIG. 8 is a second exploded view of the waterway control unit of the first embodiment of the present invention.

As shown in FIG. 4 and FIG. 5, in the first embodiment of the present invention, the opening of the mixed water outlet 433 of the integrated valve seat 43 faces downward. In this way, the mixed water outlet 433 is suitable for connecting the inner tube 2 that can be pulled and moved or the inner tube 2 that cannot be pulled and moved. The integrated valve seat 43 further has a tube hole 439 for the inner tube 2 to pass therethrough. In the present invention, the tube hole 439 provides an accommodating space to accommodate the inner tube 2, so that the inner diameter of the main body 11 of the faucet body 1 is smaller, thereby reducing the size of the faucet body 1. In addition, the inner tube 2 is inserted through the tube hole 439 of the integrated valve seat 43, which reduces the bending of the inner tube 2 so that the inner tube 2 can be pulled smoothly. The inner tube 2 passes through the tube hole 439, and the inner tube 2 is in clearance fit with the tube hole 439, so that the inner tube 2 can be pulled and moved for the user to move the faucet nozzle 3 for cleaning.

Figure 10:
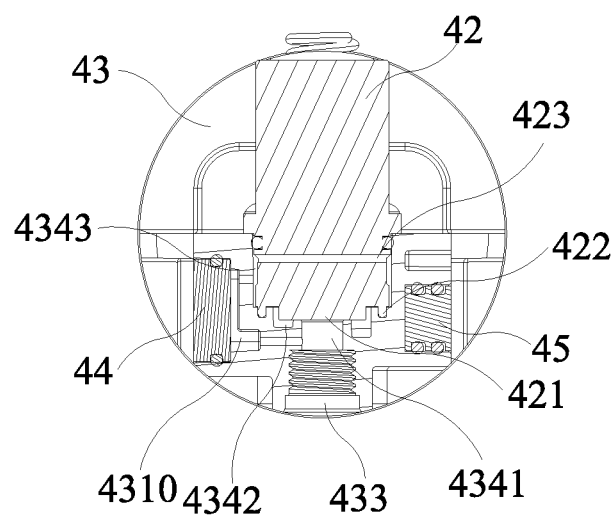
FIG. 10 is a second cross-sectional view of the waterway control unit of the first embodiment of the present invention.
Figure 11:
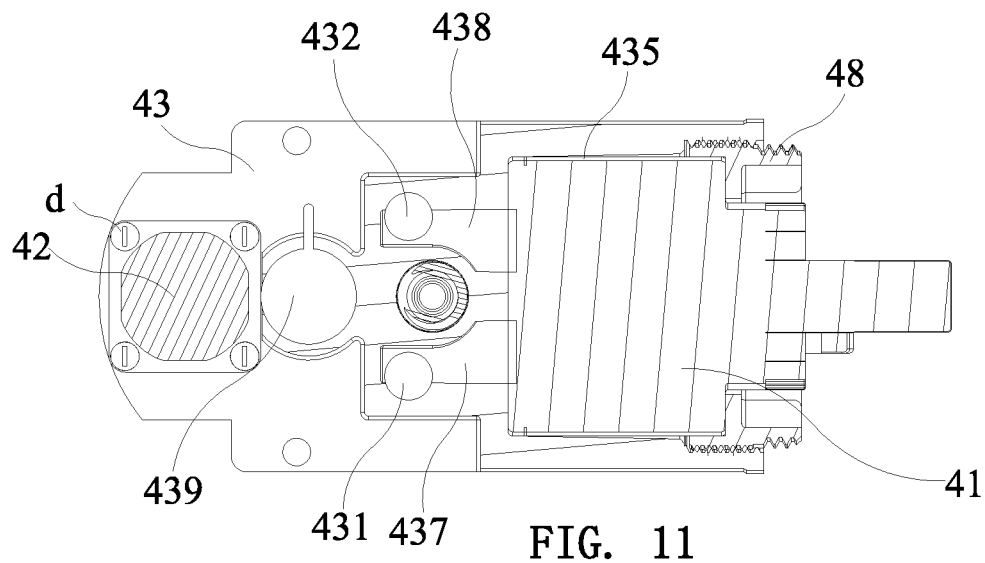
FIG. 11 is a third cross-sectional view of the waterway control unit of the first embodiment of the present invention.
Figure 12:
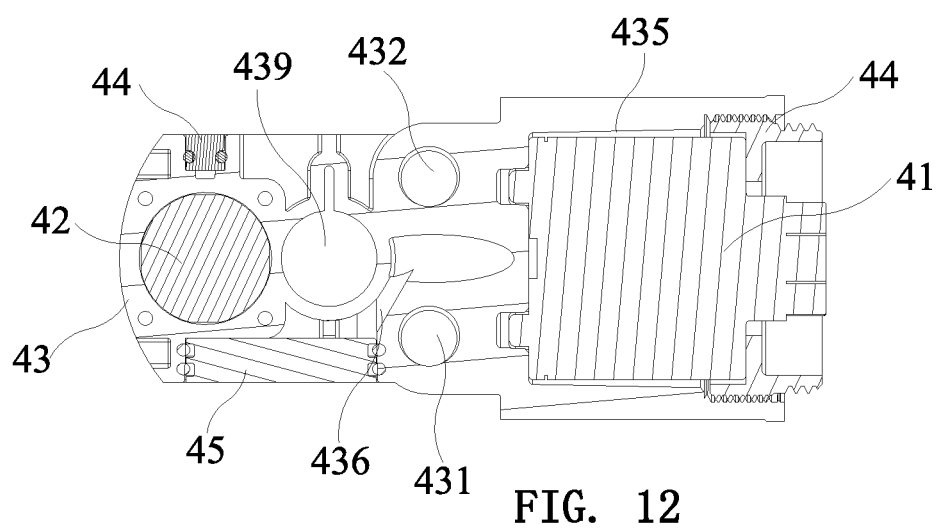
FIG. 12 is a fourth cross-sectional view of the waterway control unit of the first embodiment of the present invention.
Figure 13:
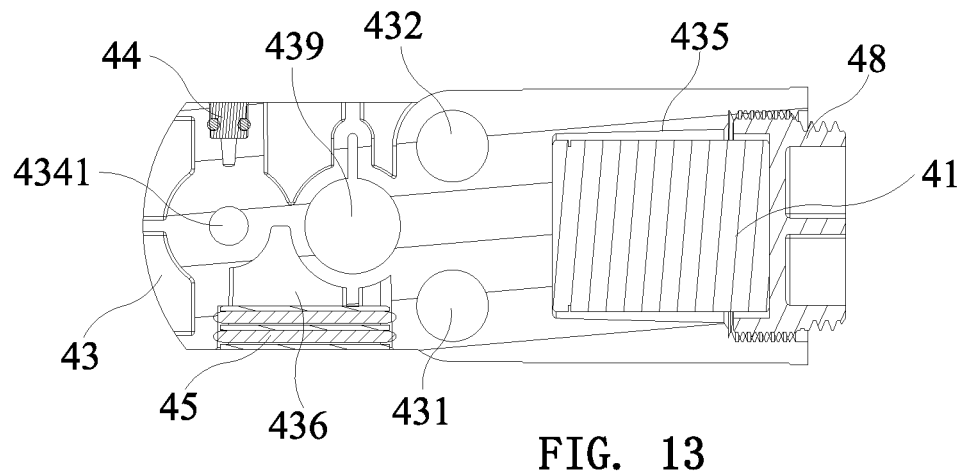
FIG. 13 is a fifth cross-sectional view of the waterway control unit of the first embodiment of the present invention.
Figure 14:
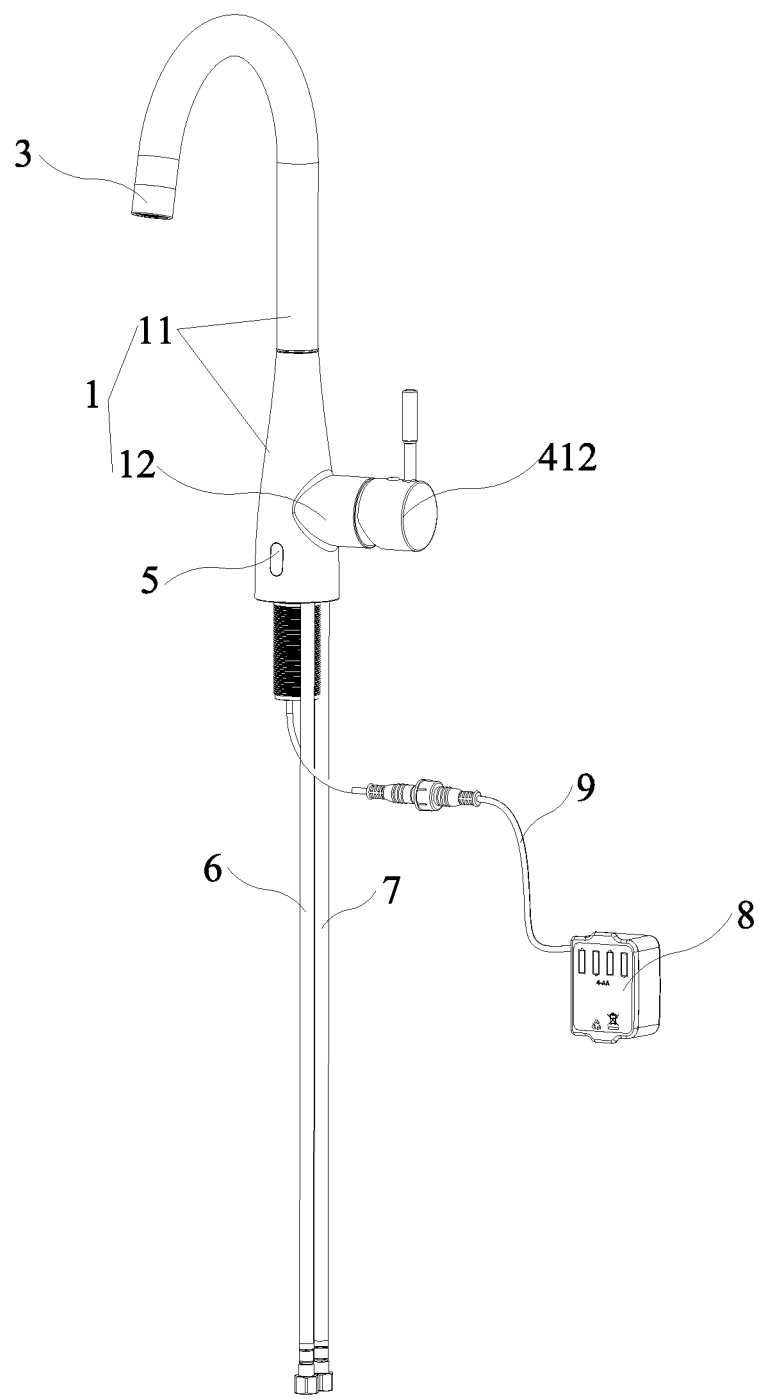
FIG. 14 is a perspective view of a second embodiment of the present invention.
Figure 15:
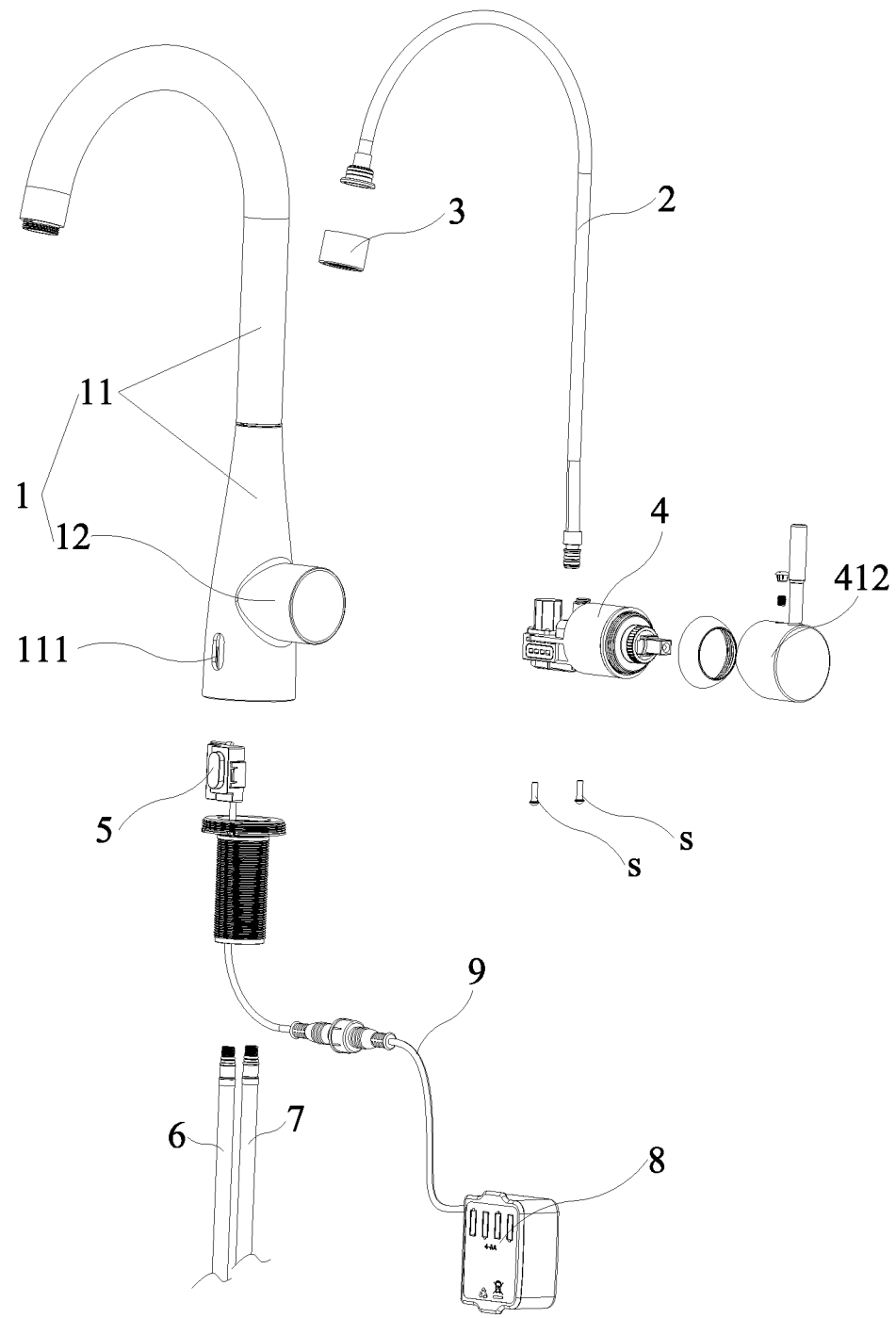
FIG. 15 is an exploded view of the second embodiment of the present invention.
Figure 16:
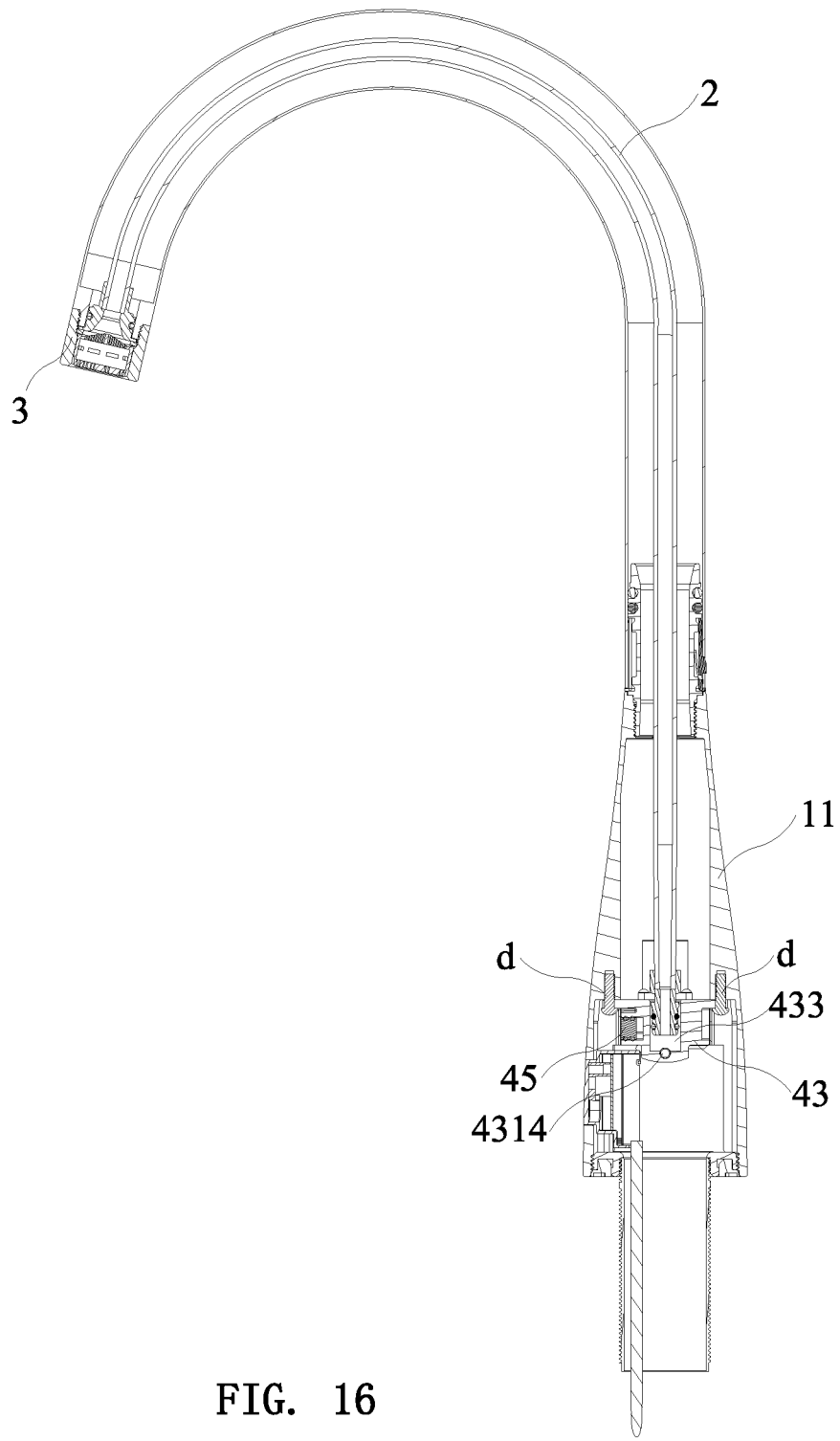
FIG. 16 is a first cross-sectional view of the second embodiment of the present invention.
Figure 17:
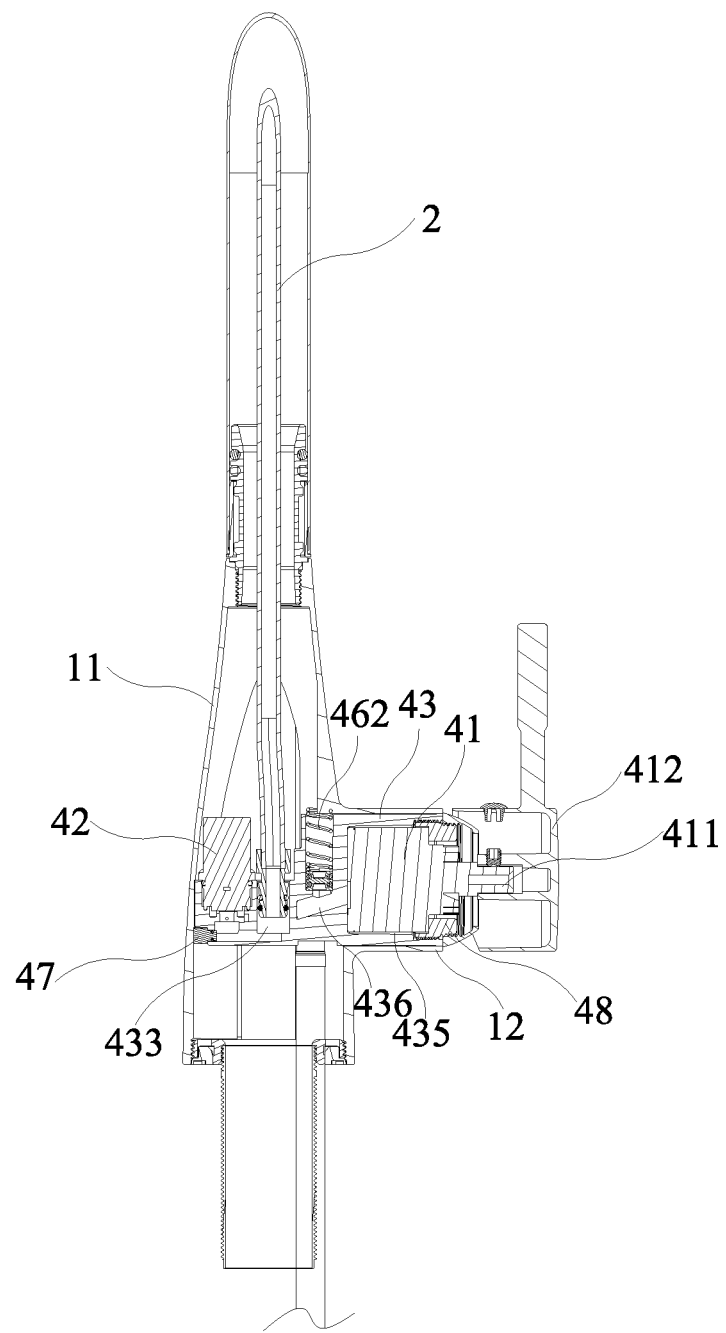
FIG. 17 is a second cross-sectional view of the second embodiment of the present invention.
Figure 18:
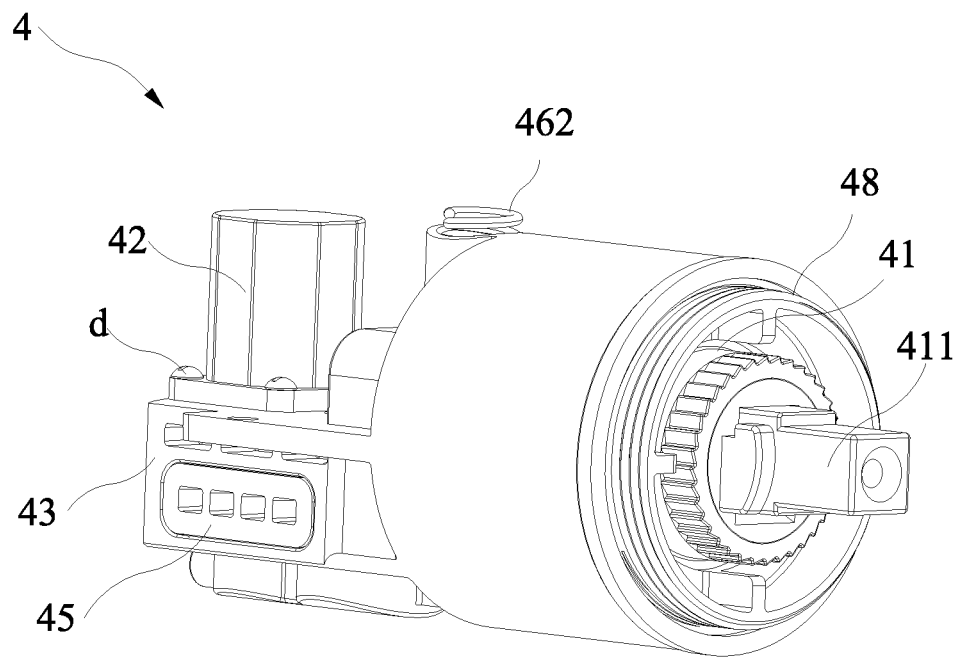
FIG. 18 is a first perspective view of the waterway control unit of the second embodiment of the present invention.
Figure 19:
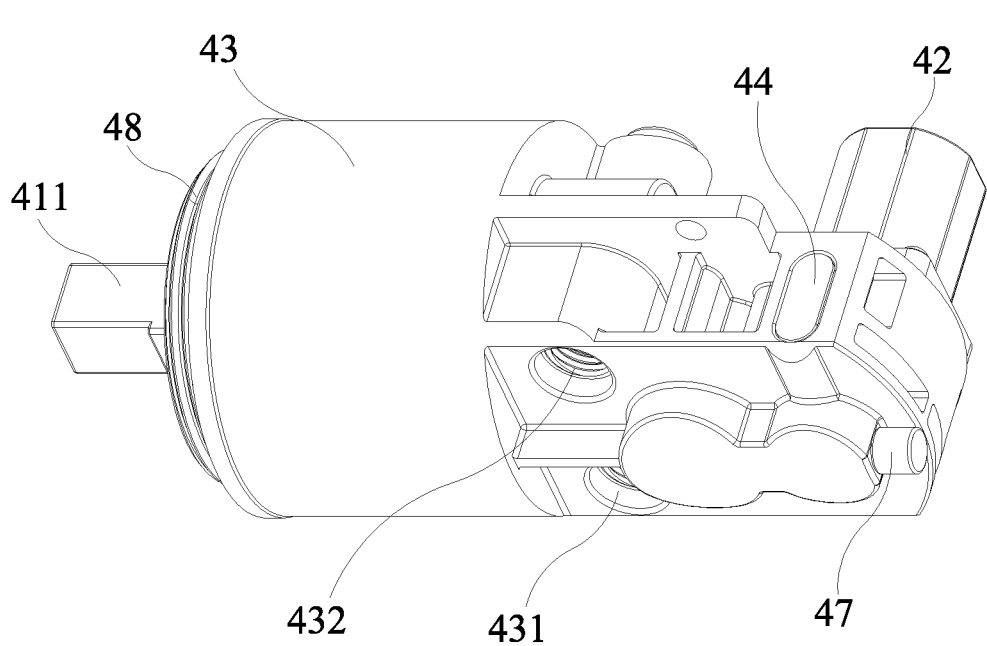
FIG. 19 is a second perspective view of the waterway control unit of the second embodiment of the present invention.
Figure 20:
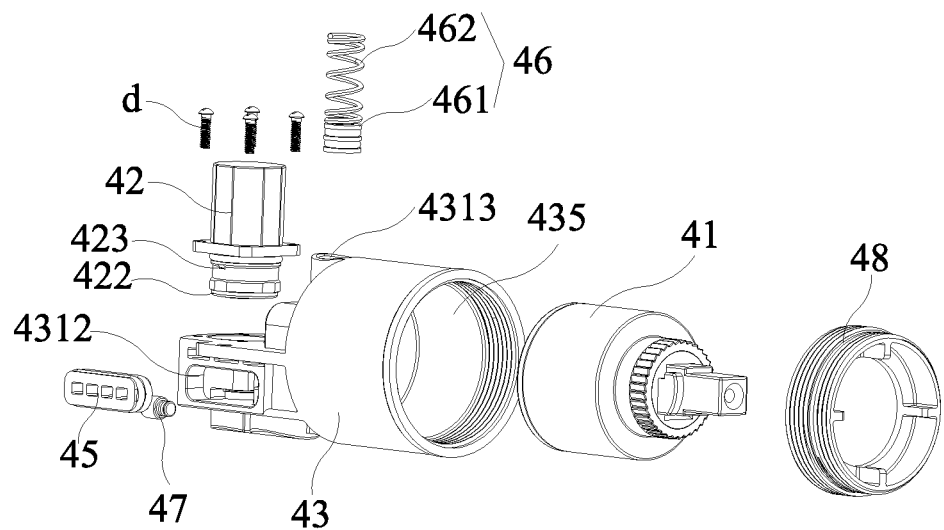
FIG. 20 is a first exploded view of the waterway control unit of the second embodiment of the present invention.
Figure 21:
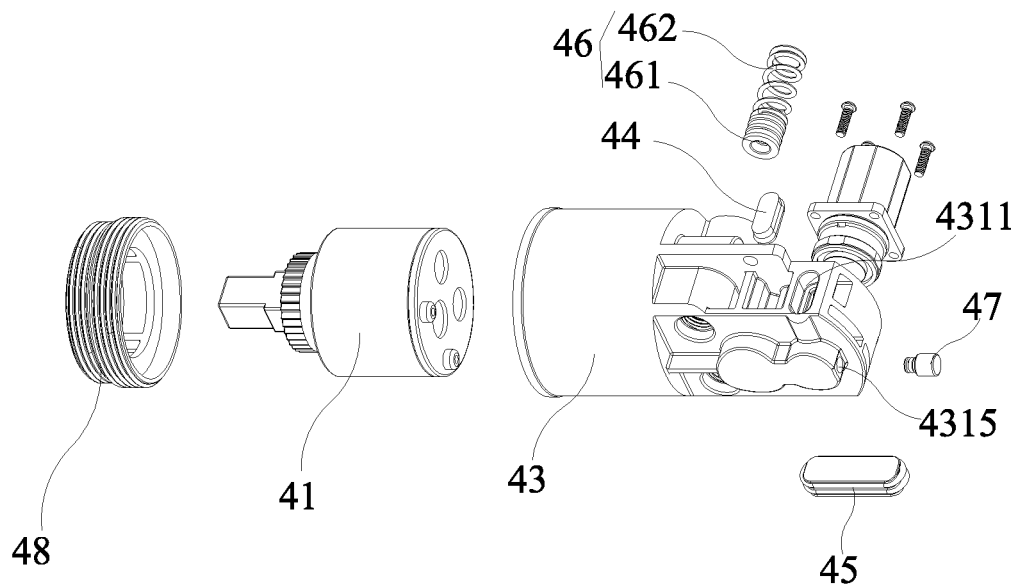
FIG. 21 is a second exploded view of the waterway control unit of the second embodiment of the present invention.

As shown in FIG. 10, in the first embodiment of the present invention, the bottom of the water-passing hole 434 is provided with an aperture 4341 communicating with the mixed water outlet 433. The valve head 421 of the solenoid valve 42 is movable to open or close the aperture 4341 for controlling the opening and closing of the mixed water outlet 433. The aperture 4341 communicates with the mixed water outlet 433 in the vertical direction. The solenoid valve 42 is controlled by a control signal to control the action of the valve head 421, so that the valve head 421 is controlled to open or close the aperture 4341.

As shown in FIG. 10, the solenoid valve 42 can block the opening of the water-passing hole 434. The solenoid valve 42 is provided with a partition 422 to divide the internal space of the water-passing hole 434 into a water chamber 4342 and an air chamber 4343. The water chamber 4342 is in communication with the valve core mounting groove 435 through the water-passing passage 436. The water chamber 4342 is also in communication with the mixed water outlet 433 through the aperture 4341. The solenoid valve 42 has an air hole 423 disposed in the air chamber 4343. The air hole 423 of the solenoid valve 42 is in communication with the air chamber 4343. The air hole 423 of the solenoid valve 42 is configured for the air to flow in and out so that the valve head 421 of the solenoid valve 42 can perform an action. The valve head 421 of the solenoid valve 42 extends into the water chamber 4342 to control the opening and closing of the mixed water outlet 433. The integrated valve seat 43 has an air passage 4310 communicating with the air chamber 4343 and the mixed water outlet 433. In the present invention, the aperture 423 can be in communication with the outside through the air passage 4310 to ensure that the valve head 421 can perform an action. The air passage 4310 communicates with the air chamber 4343 and the mixed water outlet 433. In this way, if there is a problem with the seal between the water chamber 4342 and the air chamber 4343 to result in that the water in the water chamber 4342 flows into the air chamber 4343, the water flowing into the air chamber 4343 will flow to the mixed water outlet 433 through the air passage 4310, thereby preventing water from overflowing. The integrated valve seat 43 has a core-pulling opening 4311 communicating with the air passage 4310. The core-pulling opening 4311 is blocked by a sealing plug 44 to prevent the air passage 4310 from leaking. In the present invention, the core-pulling opening 4311 is provided so that the integrated valve seat 43 can be molded by injection molding and the air passage 4310 can be formed. Similarly, the integrated valve seat 43 has a core-pulling hole 4312 communicating with the water-passing passage 436. The core-pulling hole 4312 is blocked by a core-pulling plug 45 to prevent the water-passing passage 436 from leaking. In the present invention, the core-pulling hole 4312 is provided so that the integrated valve seat 43 can be molded by injection molding and the water-passing passage 436 can be formed.

Figure 9:
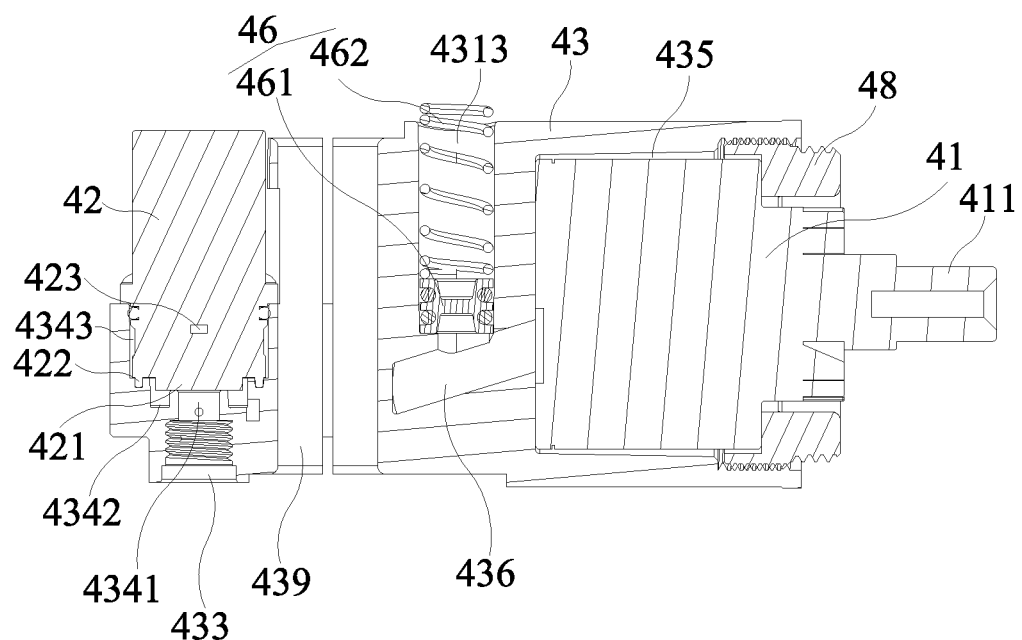
FIG. 9 is a first cross-sectional view of the waterway control unit of the first embodiment of the present invention.

As shown in FIG. 4 and FIG. 9, in the first embodiment of the present invention, the integrated valve seat 43 further has a buffer hole 4313. The inner end of the buffer hole 4313 communicates with the water-passing passage 436, and the outer end of the buffer hole 4313 communicates with the outside. A buffer assembly 46 is fitted in the buffer hole 4313. When the solenoid valve 42 shuts off the water from the mixed water outlet 433, the buffer assembly 46 can absorb the force of the water in the water-passing passage 436 to reduce the impact of the water on the integrated valve seat 43, the solenoid valve 42 and the mixed water valve core 41, thereby reducing the vibration and noise generated by the waterway control unit 4. The buffer assembly 46 includes a buffer block 461 and a buffer spring 462. The buffer block 461 is movably accommodated in the buffer hole 4313. The buffer block 461 is movably fitted in the buffer hole 4313 to prevent the buffer hole 4313 from leaking. A first end of the buffer spring 462 is inserted into the buffer hole 4313, and the first end of the buffer spring 462 abuts against one side of the buffer block 461 away from the inner end of the buffer hole 4313. A second end of the buffer spring 463 abuts against the faucet body 1 after the waterway control unit 4 is installed in the faucet body 1. When the solenoid valve 42 shuts off the water from the mixed water outlet 433, the buffer block 461 will be moved to the outer end of the buffer hole 4313 under the action of the water, thereby absorbing the force of the water.

Second Embodiment

FIGS. 14-26 show a second embodiment of the present invention. The difference between the second embodiment and the first embodiment of the present invention is the arrangement of the mixed water outlet 433. Specifically, in the second embodiment of the present invention, the opening of the mixed water outlet 433 faces upward. The mixed water outlet 433 is suitable for connecting the inner tube 2 that does not need to be pulled and moved. The inner tube 2 does not need to be pulled and moved, so that the integrated valve seat 43 does not have the tube hole 439, and the faucet nozzle 3 is connected to the faucet body 1.

Figure 22:
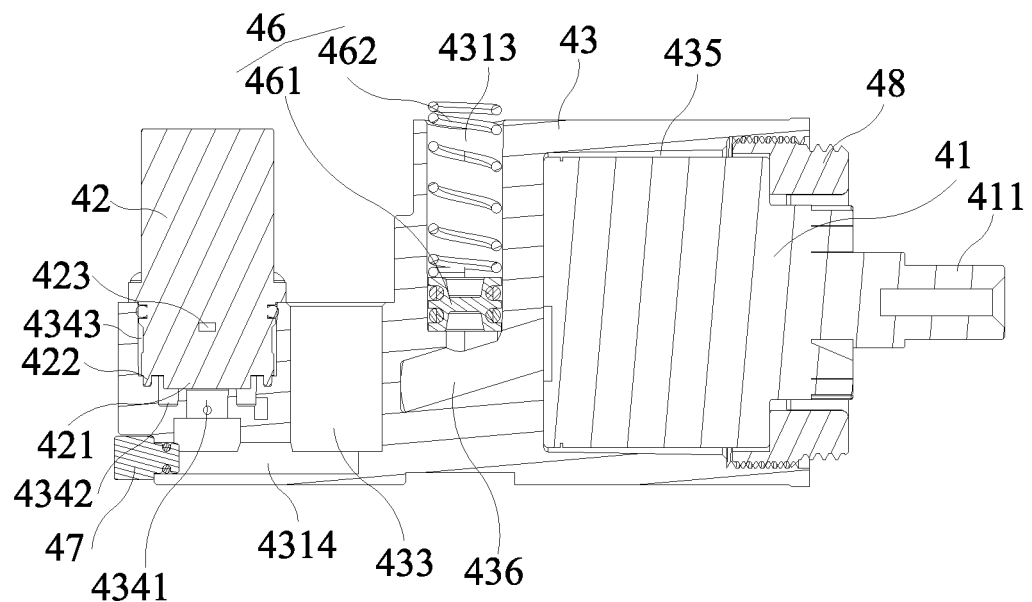
FIG. 22 is a first cross-sectional view of the waterway control unit of the second embodiment of the present invention.
Figure 23:
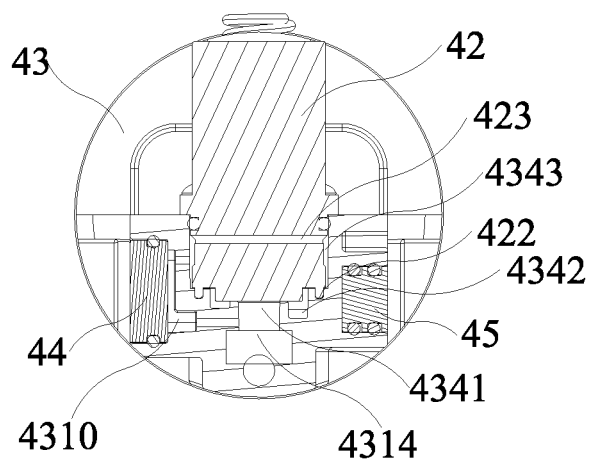
FIG. 23 is a second cross-sectional view of the waterway control unit of the second embodiment of the present invention.
Figure 24:
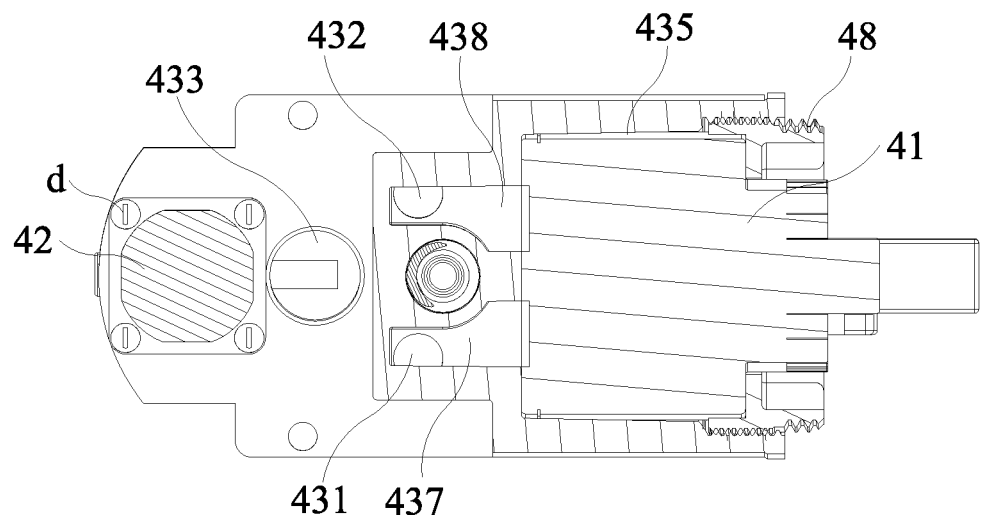
FIG. 24 is a third cross-sectional view of the waterway control unit of the second embodiment of the present invention.
Figure 25:
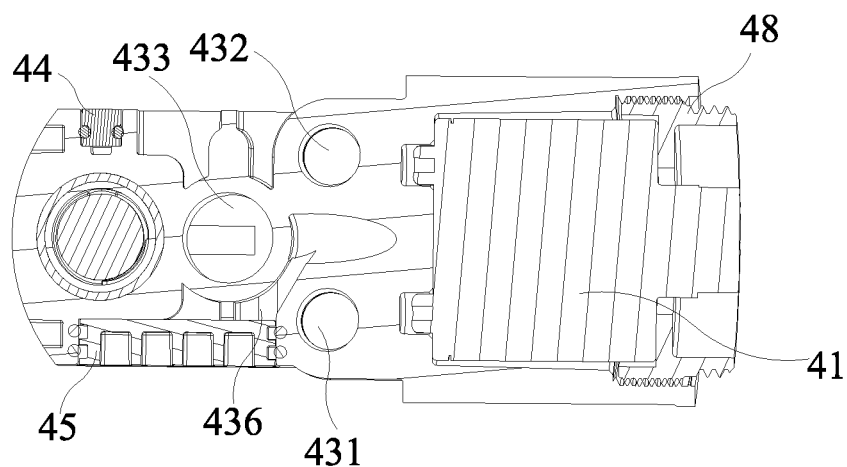
FIG. 25 is a fourth cross-sectional view of the waterway control unit of the second embodiment of the present invention.
Figure 26:
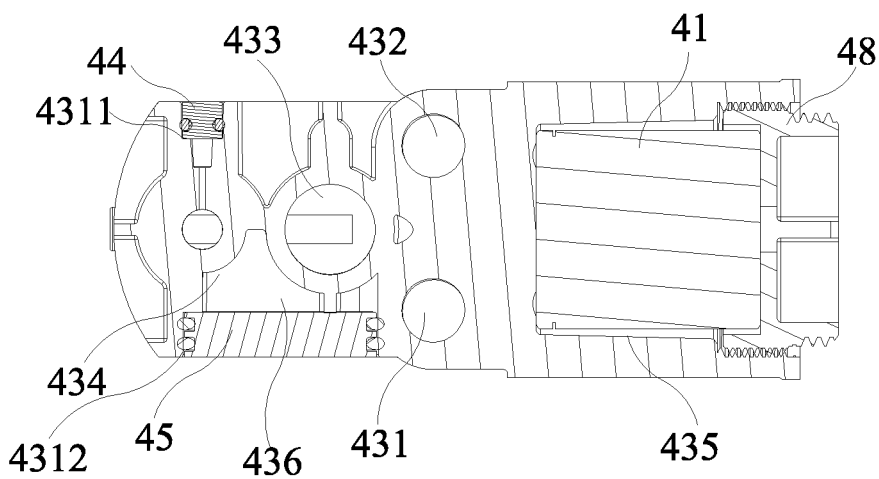
FIG. 26 is a fifth cross-sectional view of the waterway control unit of the second embodiment of the present invention.

As shown in FIG. 22 and FIG. 23, in the second embodiment of the present invention, the mixed water outlet 433 communicates with the water-passing hole 434 through a water channel 4314 disposed inside the integrated valve seat 43. The aperture 4341 at the bottom of the water-passage hole 434 is in communication with the mixed water outlet 433 through the water channel 4314. The air passage 4310 is in communication with the mixed water outlet 433 through the water channel 4314.

As shown in FIG. 22, in the second embodiment of the present invention, the integrated valve seat 43 further has a core-pulling perforation 4315 communicating with the water channel 4314. The core-pulling perforation 4315 is provided so that the integrated valve seat 43 can be molded by injection molding and the water channel 4314 is formed. The core-pulling perforation 4315 is blocked by a blocking plug 47.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An automatic faucet, comprising a faucet body, an inner tube, a faucet nozzle, a sensor, and a waterway control unit; the waterway control unit including a mixed water valve core, a solenoid valve, and an integrated valve seat; the integrated valve seat being fitted in the faucet body, the integrated valve seat having a cold water inlet, a hot water inlet, a mixed water outlet, a water-passing hole and a valve core mounting groove, the cold water inlet and the hot water inlet being in communication with the valve core mounting groove, the water-passing hole being in communication with the valve core mounting groove through a water-passing passage defined in the integrated valve seat, the mixed water outlet being in communication with the water-passing hole; the solenoid valve being installed to the integrated valve seat, the solenoid valve having a valve head extending into the water-passing hole, the valve head of the solenoid valve being configured to open and close the mixed water outlet; the mixed water valve core being installed in the valve core mounting groove of the integrated valve seat, the mixed water valve core being configured to control the cold water inlet and the hot water inlet to communicate with the water-passing passage;

the inner tube being inserted through the faucet body, the inner tube having an outlet end and an inlet end connected to the faucet nozzle and the mixed water outlet of the integrated valve seat, respectively;

the sensor being electrically connected to the solenoid valve.

2. The automatic faucet as claimed in claim 1, wherein the faucet body includes a main body and a mounting tube connected to one side of the main body, an inner chamber of the mounting tube communicates with an inner chamber of the main body;

an opening of the cold water inlet, an opening of the hot water inlet and an opening of the mixed water outlet of the integrated valve seat face downward, the cold water inlet, the hot water inlet and the mixed water outlet are located in the inner chamber of the main body, the cold water inlet and the hot water inlet are in communication with the valve core mounting groove through a cold water passage and a hot water passage arranged inside the integrated valve seat respectively, the inlet end of the inner tube is inserted through the inner chamber of the main body and connected to the mixed water outlet; the valve core mounting groove of the integrated valve seat has an opening facing one side of the integrated valve seat, the valve core mounting groove is located in the mounting tube, the mixed water valve core is inserted into the valve core mounting groove; an opening of the water-passing hole of the integrated valve seat faces upward, the solenoid valve is installed on an upper end of the integrated valve seat, and the solenoid valve is located in the inner chamber of the main body.

3. The automatic faucet as claimed in claim 2, wherein the opening of the mixed water outlet of the integrated valve seat faces downward, and the integrated valve seat further has a tube hole for the inner tube to pass therethrough.

4. The automatic faucet as claimed in claim 3, wherein the inner tube is in clearance fit with the tube hole.

5. The automatic faucet as claimed in claim 3, wherein the integrated valve seat is fixed to the faucet body by screws.

6. The automatic faucet as claimed in claim 1, wherein the solenoid valve is configured to block an opening of the water-passing hole, the solenoid valve is provided with a partition to divide an internal space of the water-passing hole into a water chamber and an air chamber, the water chamber is in communication with the valve core mounting groove through the water-passing passage, the water chamber is in communication with the mixed water outlet; the solenoid valve has an air hole disposed in the air chamber, the air hole of the solenoid valve is in communication with the air chamber, the valve head of the solenoid valve extends into the water chamber to control opening and closing of the mixed water outlet; and the integrated valve seat has an air passage communicating with the air chamber and the mixed water outlet.

7. The automatic faucet as claimed in claim 6, wherein the integrated valve seat has a core-pulling opening communicating with the air passage, and the core-pulling opening is blocked by a sealing plug.

8. The automatic faucet as claimed in claim 1, wherein the integrated valve seat further has a buffer hole, an inner end of the buffer hole communicates with the water-passing passage, an outer end of the buffer hole communicates with an outside, and a buffer assembly is fitted in the buffer hole.

9. The automatic faucet as claimed in claim 8, wherein the buffer assembly includes a buffer block and a buffer spring; the buffer block is movably accommodated in the buffer hole, the buffer block is movably fitted in the buffer hole; a first end of the buffer spring is inserted into the buffer hole, the first end of the buffer spring abuts against one side of the buffer block away from an inner end of the buffer hole, and a second end of the buffer spring abuts against the faucet body.

10. The automatic faucet as claimed in claim 1, wherein the integrated valve seat further has a core-pulling hole communicating with the water-passing passage, and the core-pulling hole is blocked by a core-pulling plug.

* * * * *